United States Patent
Miya et al.

(10) Patent No.: US 6,683,863 B2
(45) Date of Patent: Jan. 27, 2004

(54) CDMA RADIO TRANSMITTING APPARATUS AND CDMA RADIO RECEIVING APPARATUS

(75) Inventors: Kazuyuki Miya, Kawasaki (JP); Mitsuru Uesugi, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 104 days.

(21) Appl. No.: 09/968,022

(22) Filed: Oct. 2, 2001

(65) Prior Publication Data

US 2002/0012335 A1 Jan. 31, 2002

Related U.S. Application Data

(62) Division of application No. 09/070,007, filed on Apr. 30, 1998, now Pat. No. 6,330,233.

(30) Foreign Application Priority Data

Jul. 29, 1997 (JP) .............................. 9-218005

(51) Int. Cl.[7] .............................. H04B 7/216; H04J 3/16
(52) U.S. Cl. ...................... 370/342; 370/335; 370/351; 370/345; 370/474
(58) Field of Search .................... 370/209, 335, 370/342, 337, 345, 347, 351, 355, 468, 470, 474, 535, 536, 537, 538, 545; 375/309, 300, 403, 146, 147, 130, 324; 455/445

(56) References Cited

U.S. PATENT DOCUMENTS

| | | | | |
|---|---|---|---|---|
| 5,020,056 A | * | 5/1991 | Chennakeshu | 370/347 |
| 5,022,024 A | | 6/1991 | Paneth et al. | 370/345 |
| 5,535,239 A | | 7/1996 | Padovani et al. | 370/209 |
| 5,610,907 A | | 3/1997 | Barrett | 370/342 |
| 5,659,569 A | * | 8/1997 | Padovani et al. | 370/479 |
| 5,987,018 A | | 11/1999 | Freeburg et al. | 370/345 |
| 6,014,374 A | | 1/2000 | Paneth et al. | 455/418 |
| 6,016,370 A | * | 1/2000 | Hatakeyama et al. | 382/299 |
| 6,141,353 A | * | 10/2000 | Li | 370/465 |
| 6,330,233 B1 | | 12/2001 | Miya et al. | 370/342 |

FOREIGN PATENT DOCUMENTS

JP       10070772       3/1998

OTHER PUBLICATIONS

Y. Okumura et al., "Variable Rate Data Transmissions on Single Code–channel in DS–CDMA", published by the Institute of Electronics, Information and Communication Engineers, in the *Technical Report of the IEICE* (1996).

F. Kikuchi et al., "Performance of SIR–Based Transmit Power Control using Outer Loop in the Forward Link of DS–CDMA", published by the Institute of Electronics, Information and Communication Engineers, in the *Technical Report of the IEICE* (1997).

S. Seo et al., "Effects of SIR–based Transmit Power Control for Coherent DS–CDMA Mobile Communications", published by the Institute of Electronics, Information and Communication Engineers, in the *Technical Report of the IEICE* (1997).

* cited by examiner

*Primary Examiner*—Chi Pham
*Assistant Examiner*—Afsar M. Qureshi
(74) *Attorney, Agent, or Firm*—Greenblum & Bernstein, P.L.C.

(57) ABSTRACT

A CDMA radio transmission apparatus includes a multiplexer that time-multiplexes variable data and fixed data. The variable data includes a quantity of data that is variable with respect to time and the fixed data includes a quantity of data that is fixed with respect to time. A randomizer randomizes a transmission timing of the fixed data by controlling a placement of the fixed data. A data quantity converter that converts the quantity of variable data.

12 Claims, 19 Drawing Sheets

FIG. 4
PRIOR ART
(a)
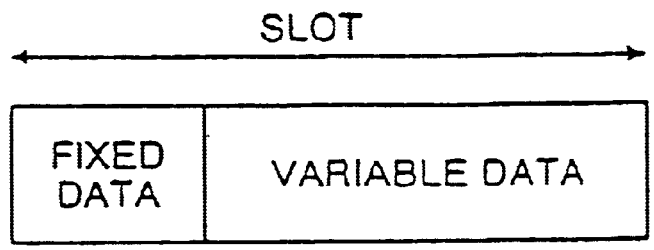
(b)
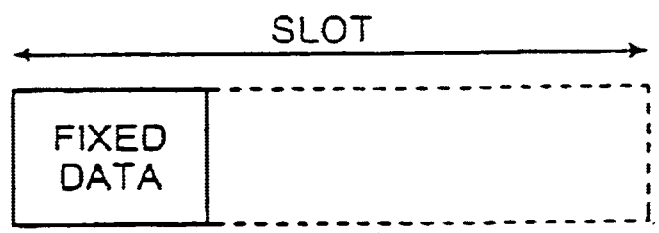
(c)
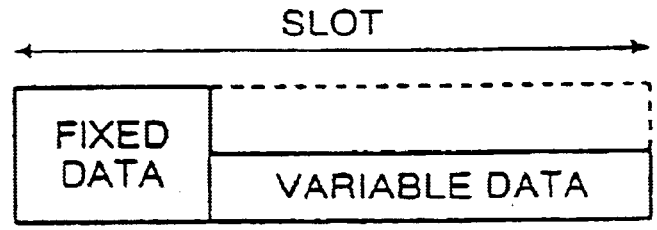
(d)
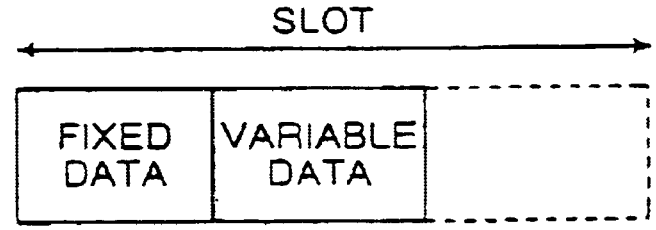

FIG. 5
PRIOR ART
(a)
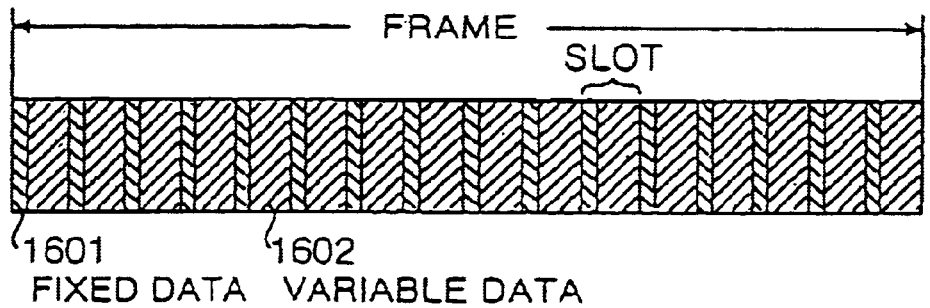
1601 FIXED DATA  1602 VARIABLE DATA
(b)
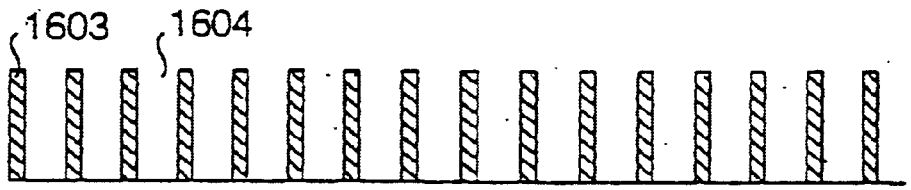
1603  1604
(c)
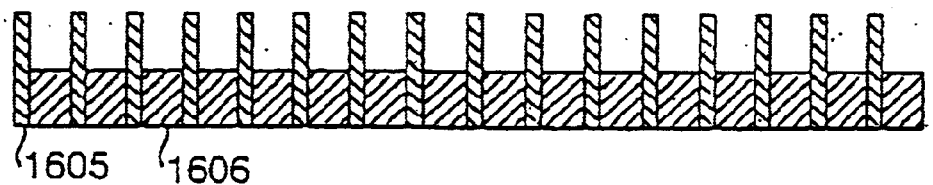
1605  1606
(d)
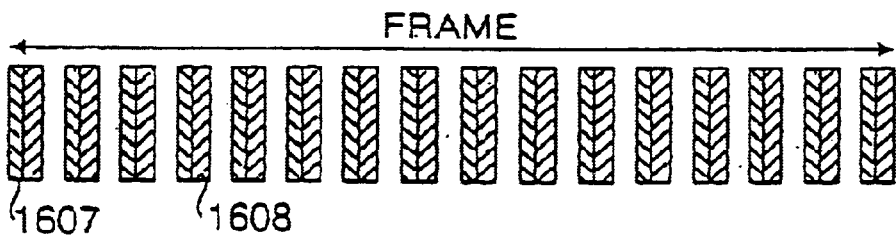
1607  1608

FIG. 19A

WITH VOICE

1ST SLOT: TPC | D0 | D1 | P | P | P | P | D2 | D3 | D4 | D5 | D6 | D7 | D8 | D9 | D10 | D11 | D12 | D13 | D14

2ND SLOT: D0 | TPC | D1 | P | P | P | P | D2 | D3 | D4 | D5 | D6 | D7 | D8 | D9 | D10 | D11 | D12 | D13 | D14

3RD SLOT: TPC | D0 | D1 | P | P | P | P | D2 | D3 | D4 | D5 | D6 | D7 | D8 | D9 | D10 | D11 | D12 | D13 | D14

4TH SLOT: D0 | D1 | TPC | P | P | P | P | D2 | D3 | D4 | D5 | D6 | D7 | D8 | D9 | D10 | D11 | D12 | D13 | D14

CDMA RADIO TRANSMITTING APPARATUS AND CDMA RADIO RECEIVING APPARATUS

CROSS-REFERENCE TO RELATED APPLICATIONS

This application is a Divisional of U.S. application Ser. No. 09/070,007, filed Apr. 30, 1998, now U.S. Pat. No. 6,330,233 the contents of which are herein incorporated by reference in their entirety.

BACKGROUND OF THE INVENTION

1. Field of the Invention

The present invention relates to a CDMA radio transmitting apparatus and a CDMA radio receiving apparatus used for digital radio communications, etc.

2. Description of the Related Art

One of the line connection systems in digital radio communications is the multiple access system in which a plurality of stations can perform communications with the same frequency band simultaneously. A type of the multiple access system that allows improvement of frequency utilization is the CDMA system.

CDMA (Code Division Multiple Access) means code division multiple accesses and refers to a technology that achieves multiple accesses through spread spectrum comminations in which an information signal spectrum is spread in an band sufficiently wide compared to the original information band width. It is also sometimes called spread spectrum multiple access (SSMA). The system in which a spread code is directly multiplied by an information signal is called "direct sequence system."

FIG. 1 shows an outline of configuration example of a conventional CDMA transmitting apparatus. With the CDMA transmitting apparatus shown in the figure, variable data 1201 is assembled by frame assembly circuit 1202 in frame units, and then time-multiplexed with fixed data 1204 by slot assembly circuit 1203. At this time, slot timing, symbol timing and data rate information 1205, etc. are input to slot assembly circuit 1203 to control the time-multiplexing timing. FIG. 2 shows the configuration of the slot assembly circuit. Transmit data 1301 which is variable data and fixed data 1204 are time-multiplexed and output by switch 1303 which is controlled by timing control circuit 1302. In slot assembly circuit 1203, a slot-assembled signal is primary-modulated by modulator 1206, CDMA-modulated by spread circuit 1207, and then amplified by RF section 1208 and transmitted from antenna 1209.

The data format of radio signals used for the CDMA transmitting apparatus above is explained below.

FIG. 3 shows an example of radio signal format. A transmit signal includes slots as its basic units, with K slots making up one frame and N frames making up one super frame.

FIG. 4 shows an example of transmit signal format in one slot. One slot includes a fixed data section with the quantity of data constant with time and a variable data section with the quantity of data variable with time.

The fixed data includes a pilot symbol which is a known signal for coherent detection on the receiving side, control signal such as power control signal, or rate information of the variable data section transmitting the quantity of data, etc. The variable data is coding data with the quantity of data variable with time such as voice information and image information.

The slot shown in FIG. 4(a) indicates a slot configuration when the data rate is high such as voice period; FIG. 4(b), when there is no data such as silent period; and FIGS. 4(c) and (d), when there is little data such as when the data rate is low.

FIG. 5 shows the power of the conventional CDMA transmitting apparatus for each frame. For example, if the data rate of transmit data is high, it transmits variable data 1602 with the same power as that of fixed data 1601 as shown in FIG. 4(a). If there is no data as shown in FIG. 5(b), fixed data 1603 is transmitted in the same way as in FIG. 5(a), while variable data 1604 is set to power 0. Furthermore, when the data rate is low as shown in FIG. 5(c), fixed data 1605 is transmitted in the same way as in FIG. 5(a), whereas variable data 1606 is transmitted with small power instead of transmitting the same signal repeatedly. This allows the quality of variable data 1606 to be kept equivalent to the quality of fixed data 1605. At the same time, transmitting variable data 1606 with low power can reduce interference with other users in that portion of data. Furthermore, when the data rate is low as shown in FIG. 5(d), fixed data 1607 is transmitted in the same way as in FIG. 5(a), and variable data 1608 is also transmitted with the same power, but can also be cut midway if there is little data. This allows the quality of variable data 1608 to be kept equivalent to the quality of fixed data 1607.

When the data rate is high, this results in a power pattern as shown in FIG. 5(a); when there is no data, a power pattern as shown in FIG. 5(b); and when the data rate is low, power patterns as shown in FIG. 5(c) or (d).

On the other hand, in the CDMA receiving apparatus on the receiving side, as shown in FIG. 6, the signal received by antenna 1701 is down-converted by RF circuit 1702 and then despread by despread circuit 1703, demodulated by demodulator 1704 and separated by slot disassembly circuit 1705 into the fixed data section and variable data section. Frame assembly circuit 1707 output the variable data as receive data. In slot disassembly circuit 1705 as shown in FIG. 7, demodulator output 1801 resulting from time-multiplexing of the variable data and fixed data is separated into fixed data 1805 and variable data 1806 by switch 1804 controlled by timing control circuit 1802 using slot timing, symbol timing and data rate information, etc. 1803.

However, as shown in FIGS. 5(b) and (c), with the conventional transmitting apparatus above, when there is no data or the data rate is low, turning transmit energy ON/OFF will generate a pulse signal with a power pattern of specific cycles, producing line spectrums with large power in specific frequency components, which will get mixed in hearing aids causing unnecessary sound with a specific frequency, a so-called hearing aid problem, or may affect peripheral appliances.

FIG. 8 shows an example of frequency spectrum when transmit power is turned ON/OFF in a cycle of 1.6 kHz. In this case, line spectrums generating unnecessary sound are observed in the audible range such as 1.6 kHz and 3.2 kHz.

SUMMARY OF THE INVENTION

Taking into account the above circumstances, the objective of the present invention is to provide a CDMA radio transmitting apparatus and CDMA radio receiving apparatus capable of suppressing unnecessary frequency components generated when storing multi-rate data, eliminating hearing aid problems and preventing influences on peripheral appliances in CDMA transmissions.

When time-multiplexing variable data with the quantity of data variable with time and fixed data with the quantity of data constant with time, the present invention randomizes the transmit timing of fixed data in the case that there is no variable data at least.

According to the present invention, in the case that the data rate of variable data is low or there is no variable data, the power ON/OFF timing of fixed data is randomized, which randomizes the power ON/OFF timing, and thus the present invention restrains pulses from generating in each slot, suppressing generation of line spectrums with large power in specific frequency components.

Furthermore, the present invention provides a CDMA radio transmitting apparatus that allows the transmit timing of fixed data to be randomized by controlling placement of fixed data in transmit data.

The present invention also provides a CDMA radio receiving apparatus that determines placement patterns of fixed data according to the frame number and slot number, stores only a number of slots that are housed in a super frames with a plurality of frames forming one unit and selects placement patterns based on the frame number and slot number to which the fixed data belongs.

The present invention allows mobile radio communication systems to control placement patterns of fixed data using the slot number and frame number which are kept synchronized between the transmitting side and receiving side, facilitating disassembly of slots on the receiving side. Furthermore, since placement patterns are stored in quantity corresponding to the number of slots housed in a super frame, different placement patterns can be used even with the same slot number as long as the frame numbers are different. In addition, since the placement pattern for randomizing the transmit timing of fixed data is repeated in a super frame cycle, the transmit timing of fixed data is randomized to an extent that it will not affect peripheral devices at close range.

The present invention maintains a first placement pattern group that includes a plurality of placement patterns in which fixed data is placed in such a way that it is concentrated on the first half of the slot and a second placement pattern group that includes a plurality of placement patterns in which fixed data is randomized over the entire slot. When the quantity of data is bigger, the first placement pattern group is used, and when the quantity of variable data is smaller, the second placement pattern group is used.

In the case that the quantity of variable data is small or none, the present invention makes it possible to prevent line spectrums with large power from being generated in specific frequency components by completely randomizing the transmit timing for each slot. In the case that the data rate is high, since no line spectrums with large power are generated in specific frequency components and fixed data is concentrated on the first half of the slot, TPC reception and SIR measurement can be performed without degrading the characteristics.

Furthermore, upon receiving a signal resulting from time-multiplexing of fixed data and variable data, the present invention separates variable data from fixed data using the same placement pattern as that of fixed data used for time-multiplexing on the transmitting side.

The present invention allows precise reception by separating fixed data and variable data from the randomized transmit timing.

BRIEF DESCRIPTION OF THE DRAWINGS

FIGS. 4(a) to 4(d) are conceptual diagrams of transit signal format in the conventional slot;

FIGS. 5(a) to (d) are pattern diagrams of power in the conventional CDMA radio transmitting apparatus;

FIGS. 19A to 19C are transmit pattern diagrams during operation with/without tone and low rate operation in the CDMA radio transmitting apparatus in Embodiment 4.

DESCRIPTION OF THE PREFERRED EMBODIMENT

With reference now to the attached drawings, the embodiments of the present invention are described in detail below:
(Embodiment 1)

Figure 9:
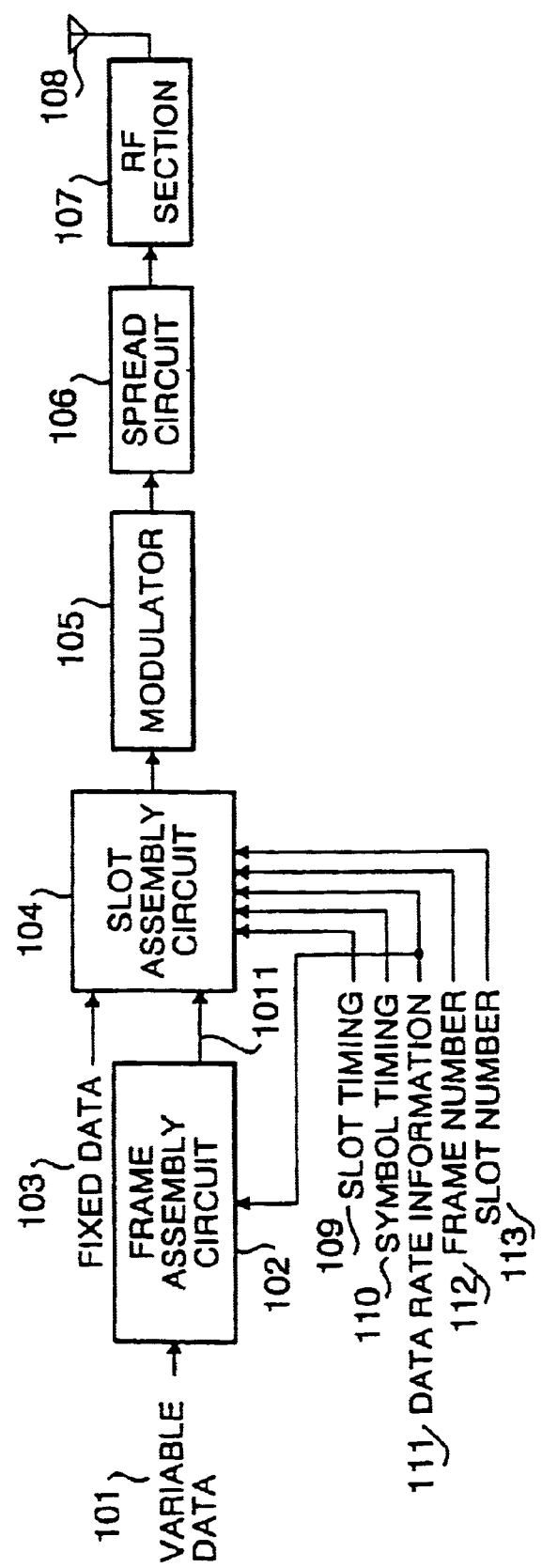
FIG. 9 is a configuration diagram of the CDMA radio transmitting apparatus in Embodiment 1 of the present invention.

FIG. 9 shows a configuration example of the CDMA transmitting apparatus in Embodiment 1 of the present invention. The CDMA transmitting apparatus in Embodiment 1 comprises frame assembly circuit 102 that assembles variable data 101 in frame units, slot assembly circuit 104 that generates slots by time-multiplexing the variable data assembled in frame units and fixed data 103, modulator 105 that primary-modulates the time-multiplexed signal, spreading circuit 106 that spread-modulates the primary-modulated signal, RF section 107 that amplifies the spread-modulated signal for transmission, and antenna 108 that carries out radio transmission.

Figure 10:
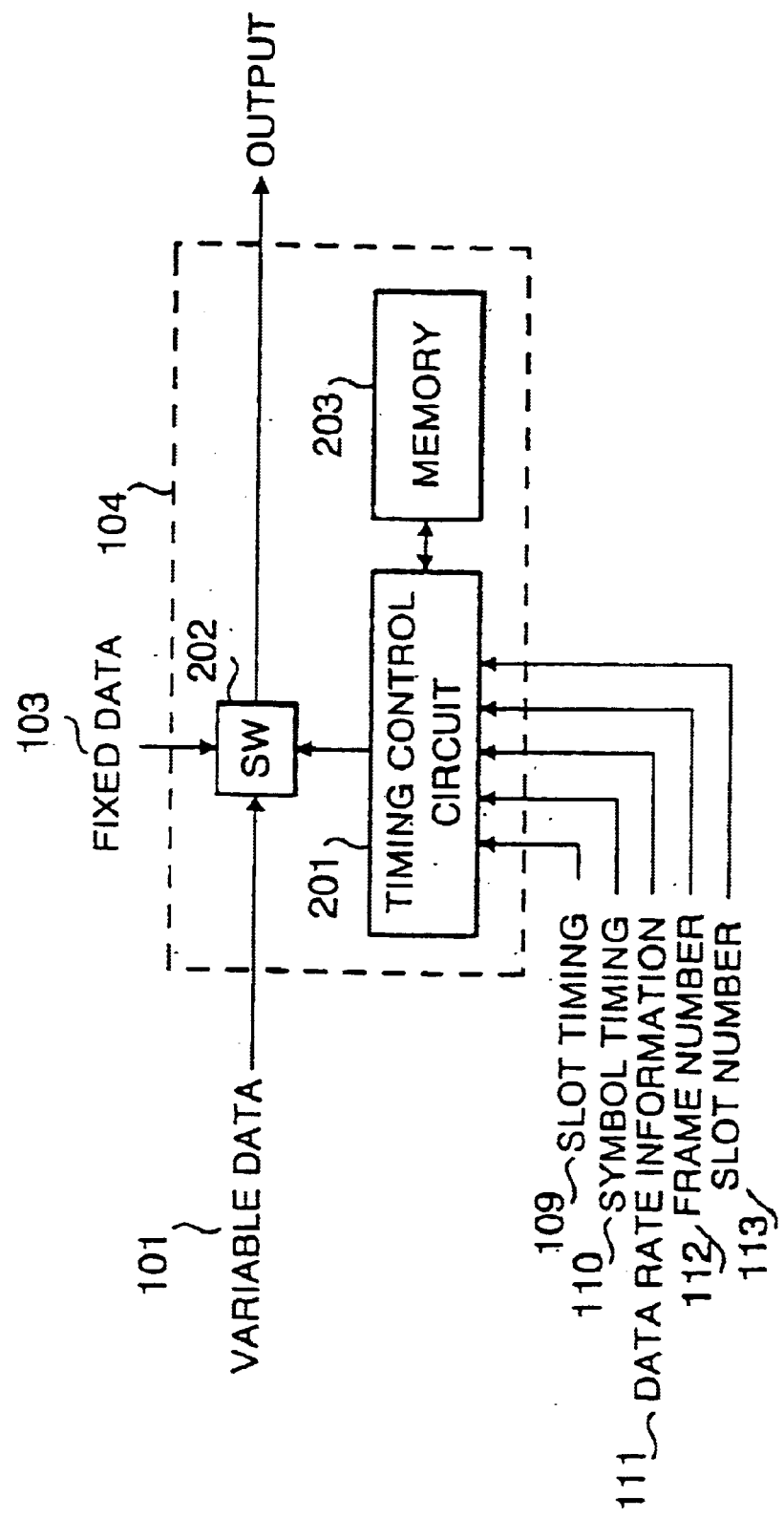
FIG. 10 is a configuration diagram of the slot assembly circuit of the CDMA radio transmitting apparatus in Embodiment 1.

In said slot assembly circuit 104, slot timing 109, symbol timing 110, data rate information 111, frame number 112, and slot number 113 are input. As shown in FIG. 10, variable data 101 and fixed data 103 are time-multiplexed by switch 202 which is controlled by timing control circuit 201. Memory 203 stores the relationship between frame number 112, slot number 113 and placement patterns of fixed data 103. Timing control circuit 201 reads information on the fixed data placement pattern in each slot (placement location of each symbol in the slot) from memory 203 according to frame number 112 and slot number 113 and controls switch 202 based on the information.

The placement pattern information of the fixed data stored in memory 203 is explained below with reference to FIG. 11 and FIG. 12.

Figure 11:
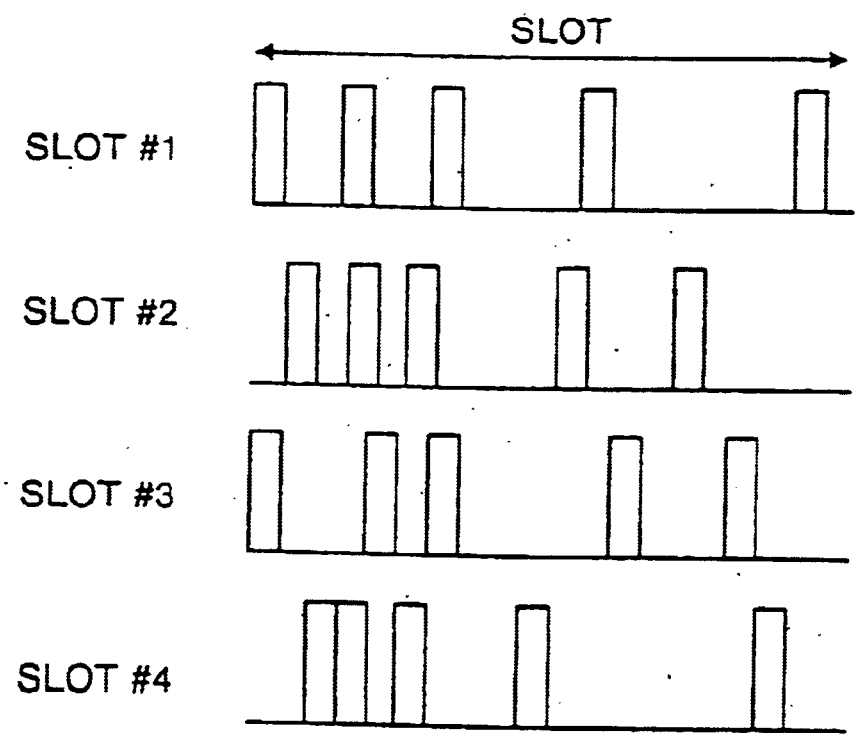
FIG. 11 is a pattern diagram showing fixed data placement locations in each slot of the CDMA radio transmitting apparatus in Embodiment 1.

FIG. 11 shows the placement patterns of the fixed data from the first slot to the fourth slot when there is no variable data such as silence. Five symbols of fixed data are placed in each slot and their locations are different in all slots. Since there is a limit to the storage capacity available for placement pattern information depending on the storage capacity of memory 203, it is necessary to store an appropriate number of placement patterns.

Figure 12:
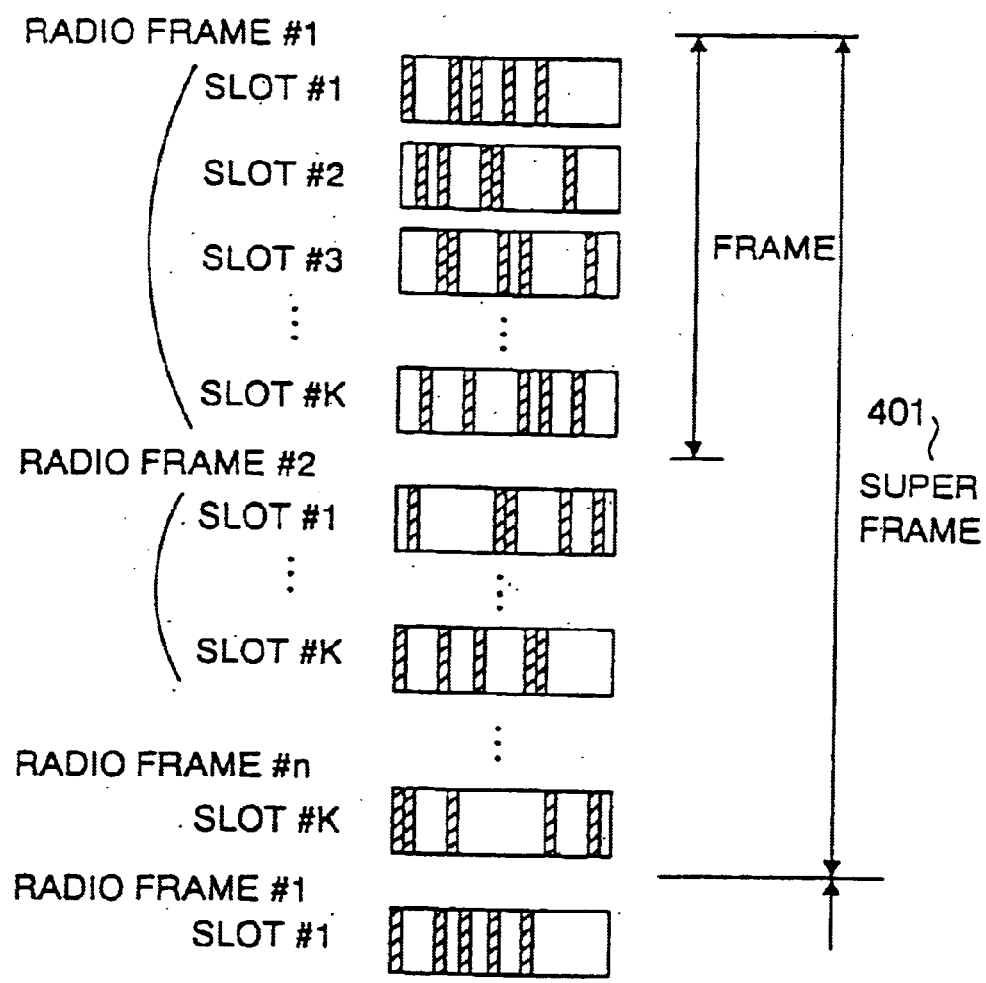
FIG. 12 is a pattern diagram showing the repetition cycle of placement patterns of fixed data in the CDMA radio transmitting apparatus in Embodiment 1.

According to the present embodiment, as shown in FIG. 12, in super frame 401 consisting of a plurality of frames, all slots are set to have placement patterns different from each other. The placement location of fixed data with 5 symbols per slot is repeated every super frame 401. It is possible to randomly read the placement patterns of the fixed data in super frames by storing their respective placement patterns at memory addresses which are combinations of a frame number and slot number.

Then, the operation of the CDMA transmitting apparatus configured above is explained below.

After variable data 101 is assembled in frame units by frame assembly circuit 102, it is time-multiplexed with fixed data 103 by slot assembly circuit 104.

At this time, in addition to slot timing 109, symbol timing 110 and data rate information 111, frame number 112 and slot number 113 are input to slot assembly circuit 104 in order to control the time-multiplexing timing.

In the case that data rate information 111 indicates that there is no variable data 101, timing control circuit 201 of slot assembly circuit 104 accesses memory 203 at the memory address corresponding to frame number 205 and slot number 206 at that time to read the placement pattern of the fixed data. Then, it controls switch 202 based on that information.

In the case that timing control circuit 201 of slot assembly circuit 104 judges from the data rate information that the data rate of variable data 101 is low, it does not randomize the fixed data, but performs conversion so that the quantity of data be kept at a certain level by repeating the same signal of variable data 101.

The slot-assembled signal is primary-modulated by modulator 105, spread-modulated by spread circuit 106 and amplified in RF section 107 and transmitted from antenna 108.

Figure 13:
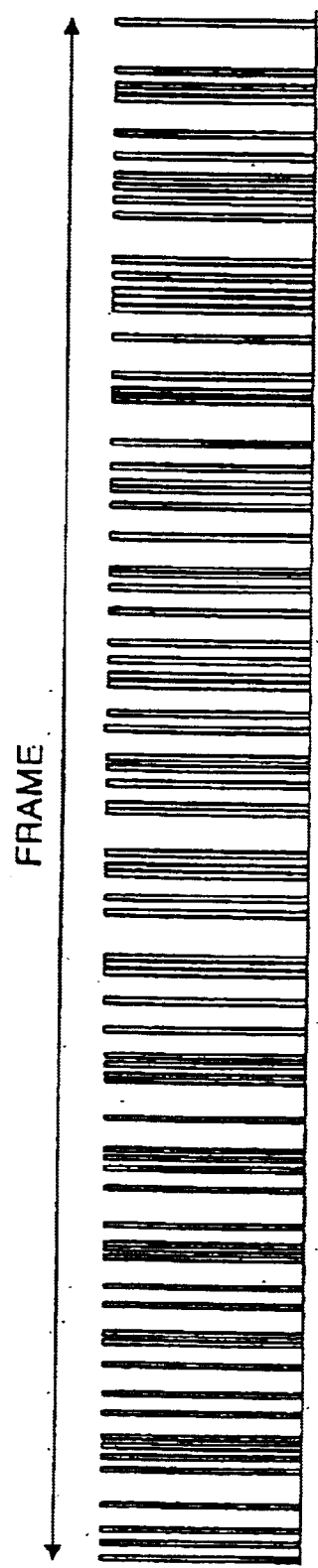
FIG. 13 is a power pattern diagram in the CDMA radio transmitting apparatus in Embodiment 1.

FIG. 13 shows the situation of transmit output power in one frame period when there is no variable data. It solely consists of the fixed data power, unlike the conventional system, however, the power ON/OFF timing is randomized and thus it prevents pulses from generating in each slot, restraining line spectrums with large power from generating in specific frequency components.

In this way, when the data rate of variable data is low, Embodiment 1 converts data by repeating the same signal, etc. so that the quantity of data be kept constant, and when there is no variable data, it randomizes the placement location of the fixed data of the symbol in each slot preventing pulses from generating in each slot thereby restraining line spectrums with large power from generating in specific frequency components.

Furthermore, according to Embodiment 1, since a long-cycle repetition of placement patterns of fixed data takes place every super frame, the placement patterns of fixed data differ from one another if their frame numbers are different even if their slot numbers are the same, allowing the cyclicity of fixed data to be randomized when there is no variable data.

(Embodiment 2)

Embodiment 2 describes an example of CDMA receiving apparatus that can separate fixed data and variable data from the receive signal which is the signal with the fixed data randomized sent from the CDMA transmitting apparatus in Embodiment 1 described above.

Figure 14:
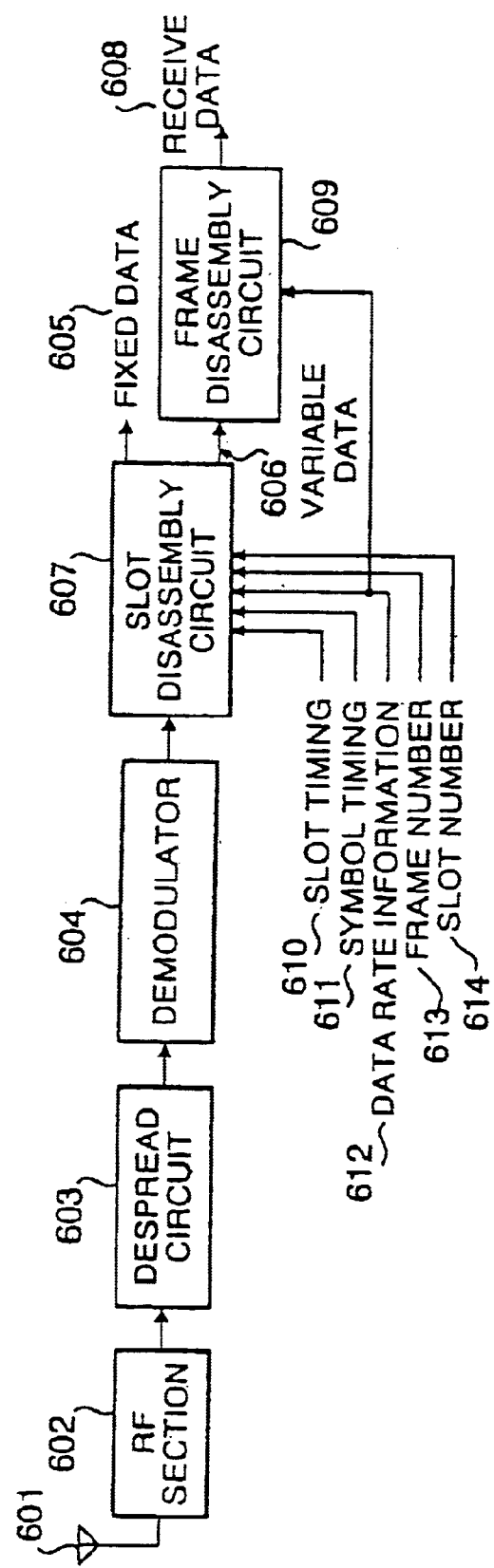
FIG. 14 is a configuration diagram of the CDMA radio receiving apparatus in Embodiment 2 of the present invention.

FIG. 14 shows a configuration example of the CDMA receiving apparatus in Embodiment 2 that relates to the present invention. The CDMA receive system in the present embodiment comprises antenna 601, RF section 602 that down-converts the signal received by antenna 601, despread circuit 603 that despreads the down-converted signal, demodulator 604 that demodulates the despread signal, slot disassembly circuit 607 that separates the demodulator output into fixed data 605 and variable data 606 using the placement pattern information of the fixed data, and frame disassembly circuit 609 that converts variable data 606 divided into frames to receive data 608 in the original state.

Figure 15:
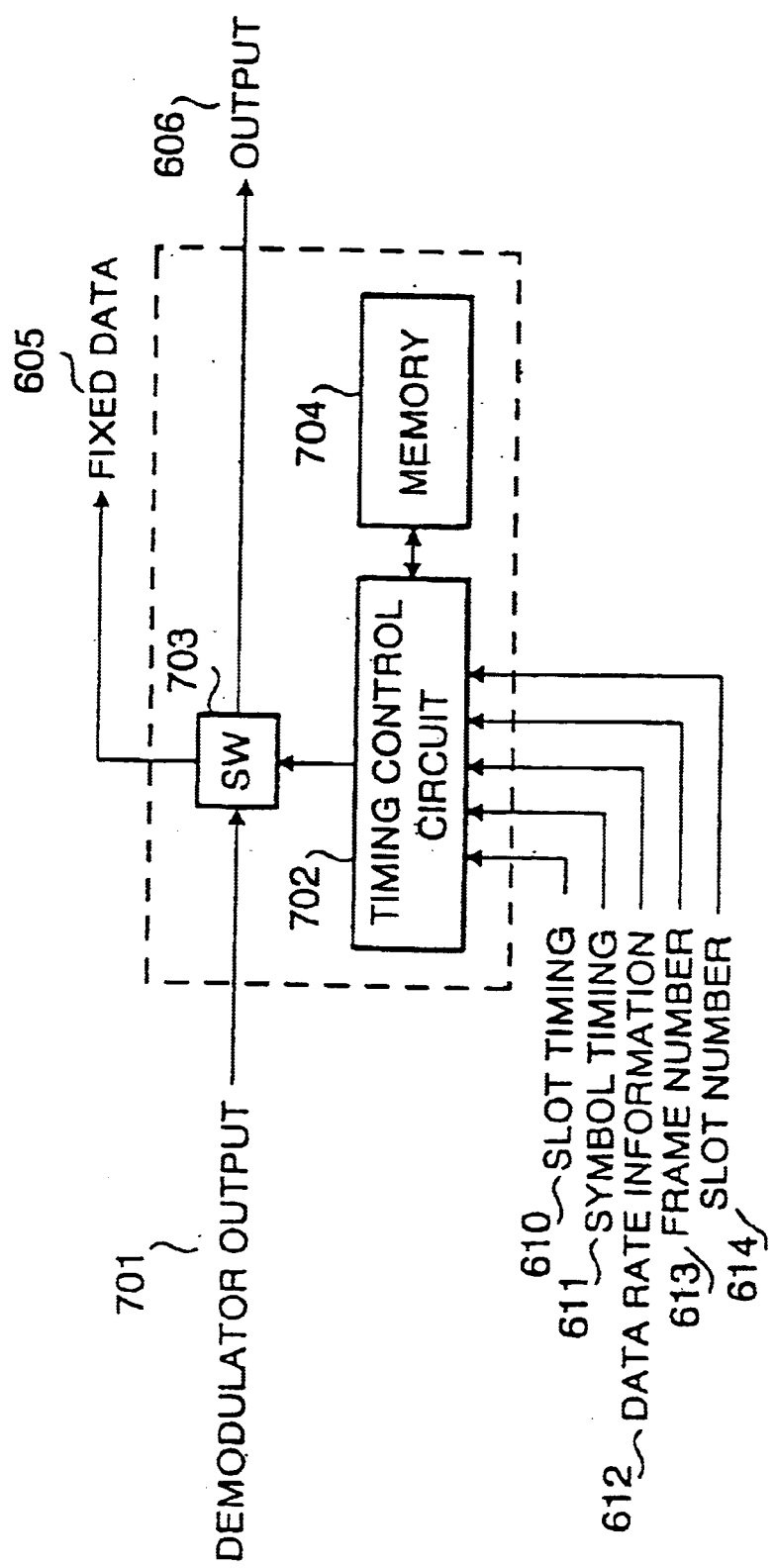
FIG. 15 is a configuration diagram of the slot assembly circuit of the CDMA radio transmitting apparatus in Embodiment 2.

In slot disassembly circuit 607 above, slot timing 610, symbol timing 611, data rate information 612, frame number 613, and slot number 614 are input. As shown in FIG. 15, demodulator output 701 is separated into fixed data 605 and variable data 606 by switch 703 controlled by timing control circuit 702. Memory 704 stores the same placement pattern information as that of memory 203 in Embodiment 1 above using the combination of frame number 613 and slot number 610 as the memory address. Timing control circuit 702 reads the placement pattern information of the fixed data in each slot from memory 704 according to frame number 613 and slot number 614, and controls switch 703 based on that information.

In the case that a mobile radio communication system is constructed using the CDMA radio transmitting apparatus in Embodiment 1 and the CDMA radio receiving apparatus in Embodiment 2, slot timing (109, 610), symbol timing (110, 611), data rate information (111, 612), frame number (112, 613), and slot number (113, 614) in the CDMA radio transmitting apparatus and the CDMA radio receiving apparatus are mutually synchronized, and therefore they constitute the same data.

Then, the operation of the CDMA receiving apparatus configured above is described below.

The signal received by antenna 601 is down-converted by RF section 602, despread by despread circuit 603 and then demodulated by demodulator 604 and input to slot disassembly circuit 605.

In timing control circuit 702 of slot disassembly circuit 605, if the data rate information input indicates that there is no variable data, the placement patterns of the fixed data included in demodulator output 701 are randomized, and thus slot disassembly that will match the placement patterns is required.

In the present embodiment, timing control circuit 702 accesses memory 704 at the memory address which is a combination of frame number 613 and slot number 614 at that time and reads the same placement pattern as that used by the transmitting side to randomize the fixed data. Then, for demodulator output 701 resulting from time-multiplexing of variable data and fixed data, timing control circuit 702 controls switch 703 based on the read placement pattern and outputs by separating it into fixed data 605 and variable data 606.

When the demodulator output is separated into fixed data 605 and variable data 606, variable data 606 is output as receive data 608 by frame disassembly circuit 609.

In this way, according to Embodiment 2, memory 704 stores the placement pattern of fixed data in accordance with the frame number and slot number and the same placement pattern as that for transmission can be acquired according to the frame number 613 and slot number 614 of the receive signal. This allows fixed data 605 and variable data 606 to be separated from the randomized transmit timing, providing precise reception.

(Embodiment 3)

Embodiment 3 describes an example of the CDMA radio transmitting apparatus that, when the data rate of variable data is low, inserts the same signal repeatedly, while transmitting the variable data with smaller power compared to the fixed data.

Figure 16:
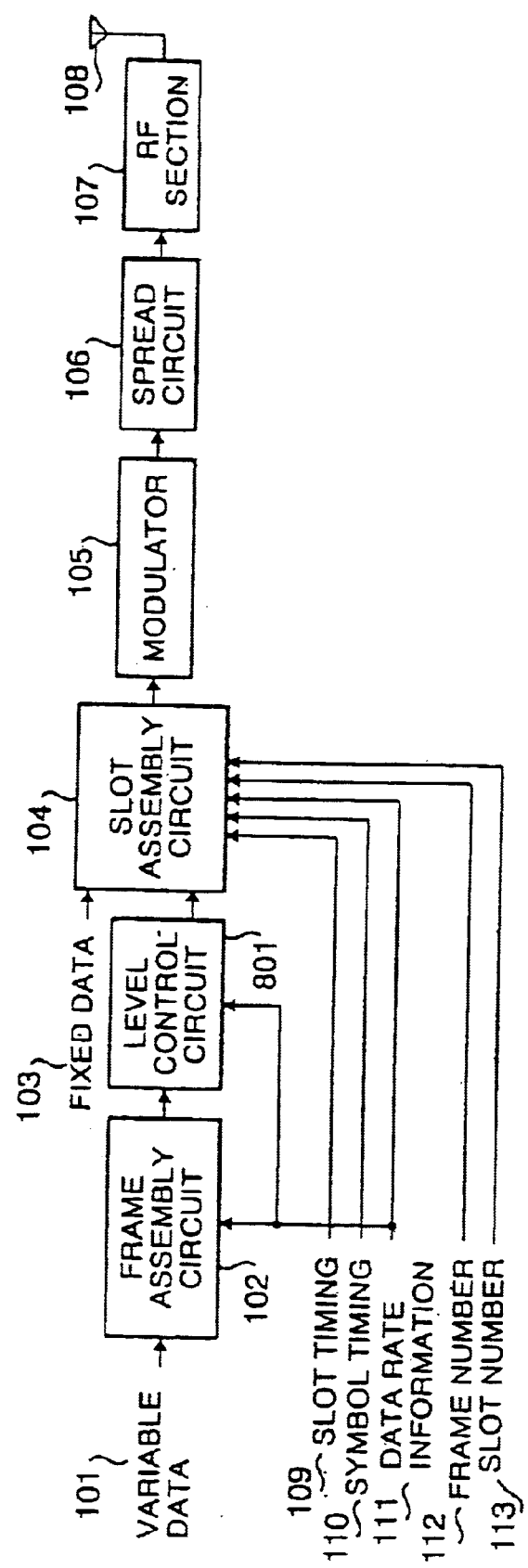
FIG. 16 is a configuration diagram of the CDMA radio transmitting apparatus in Embodiment 3 of the present invention.

FIG. 16 shows a configuration example of the CDMA transmitting apparatus in Embodiment 3 of the present invention. The CDMA transmitting apparatus in the present embodiment comprises frame assembly circuit 102 that assembles variable data 101 in frame units, level control circuit 801 that controls the level equivalent to the power of the variable data assembled in frame units, slot assembly circuit 104 that generates slots resulting from time-multiplexing of the level-controlled variable data and fixed data 103, modulator 105 that primary-modulates the time-multiplexed signal, spread circuit 106 that CDMA-modulates the primary-modulated signal, RF section 107 that amplifies the CDMA-modulated signal for transmission, and antenna 108 that carries out radio transmission.

In the case that the data rate information indicates a low rate, level control circuit 801 functions to lower the level of the variable data so that the variable data be transmitted with smaller power compared to the fixed data.

Then, the operation of Embodiment 3 configured above is explained below.

Frame assembly circuit 102 assembles variable data 101 in frame units and at the same time judges the data rate of variable data 101 from data rate information 110, and if the data rate is low, it repeats the same signal so that the quantity of data be kept constant.

Level control circuit 801 judges the data rate of variable data 101 from data rate information 110 as in the case of frame assembly circuit 102. If the rate of variable data 101 is low, the same signal is repeated for the variable data output from frame assembly circuit 102, and therefore Level control circuit 801 controls so that the level of the signal be lowered. For example, if the time length of the signal is doubled by repeating the same signal of variable data twice, it lowers the level to ½. This allows the quality of variable data to be equal to the quality of fixed data even if the power is reduced.

Figure 17:
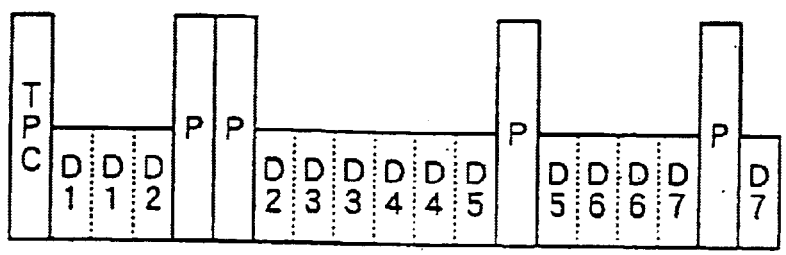
FIG. 17 is a transmit pattern diagram of the CDMA radio transmitting apparatus in Embodiment 3.

In slot assembly circuit 104, if the variable data level-controlled by level control circuit 801 is input, the data rate information input at that time indicates that the rate of the variable data is low. Therefore, as in the case of Embodiment 1 above, the placement pattern of the fixed data is read from memory 203 based on frame number 112 and slot number 113, and fixed data 103 and variable data are time-multiplexed based on the placement pattern of the randomized fixed data. FIG. 17 shows the slot resulting from time-multiplexing of the level-controlled variable data and the randomized fixed data.

The slot-assembled signal is primary-modulated by modulator 105, CDMA-modulated by spread circuit 106, amplified by RF section 107, and transmitted from antenna 108.

According to Embodiment 3, not only can the quality of variable data be kept equivalent to the quality of fixed data, but also the power of variable data can be reduced, making it possible to reduce interference of variable data with other users.

(Embodiment 4)

Embodiment 4 that relates to the present invention describes a CDMA radio transmitting apparatus that switches a high rate placement pattern in which fixed data is placed concentrated on the first half of a slot and a low rate or non-data placement pattern in which fixed data is randomly placed in the slot according to the data rate of variable data.

The CDMA radio transmitting apparatus in the present embodiment has the basic configuration identical to that of the CDMA radio transmitting apparatus described in Embodiment 3 with differences in part of the configuration of slot assembly circuit 104 and processing details. The differences from Embodiment 3 are explained below in detail.

Figure 18:
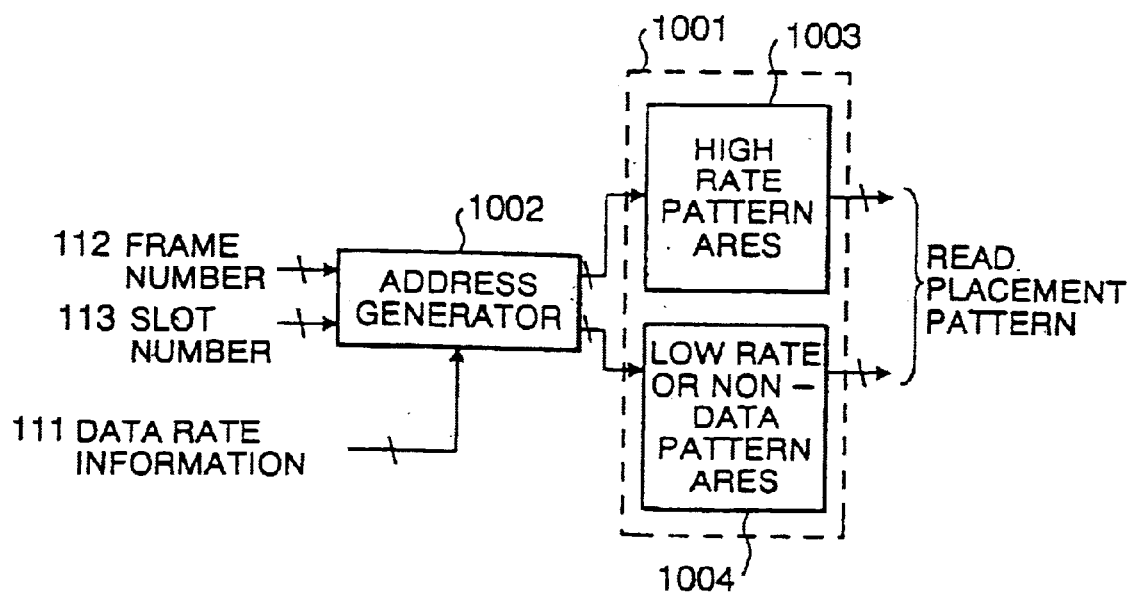
FIG. 18 is a partial configuration diagram of the slot assembly circuit of the CDMA radio transmitting apparatus in Embodiment 4 of the present invention.
Figure 19B:
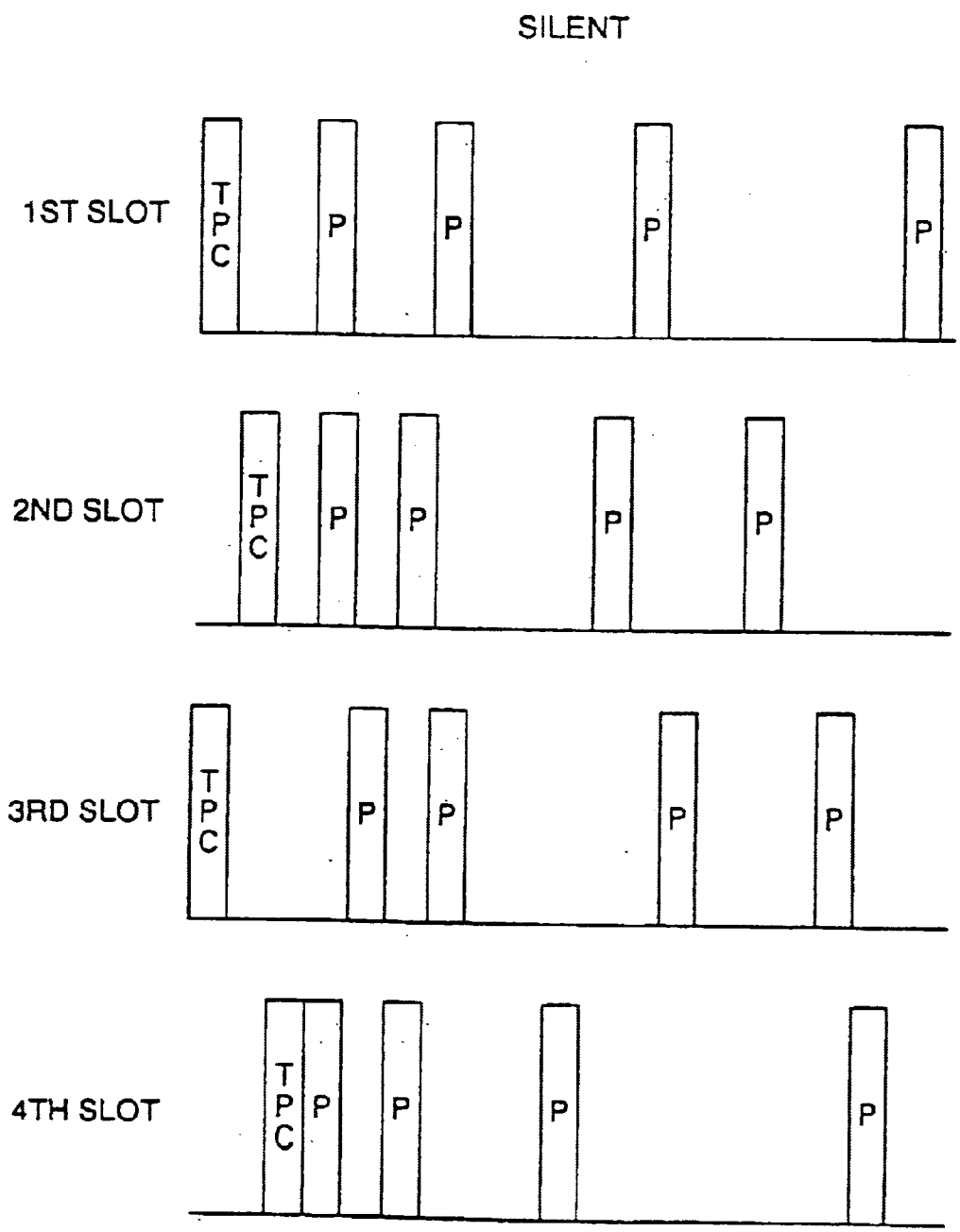
Figure 19C:
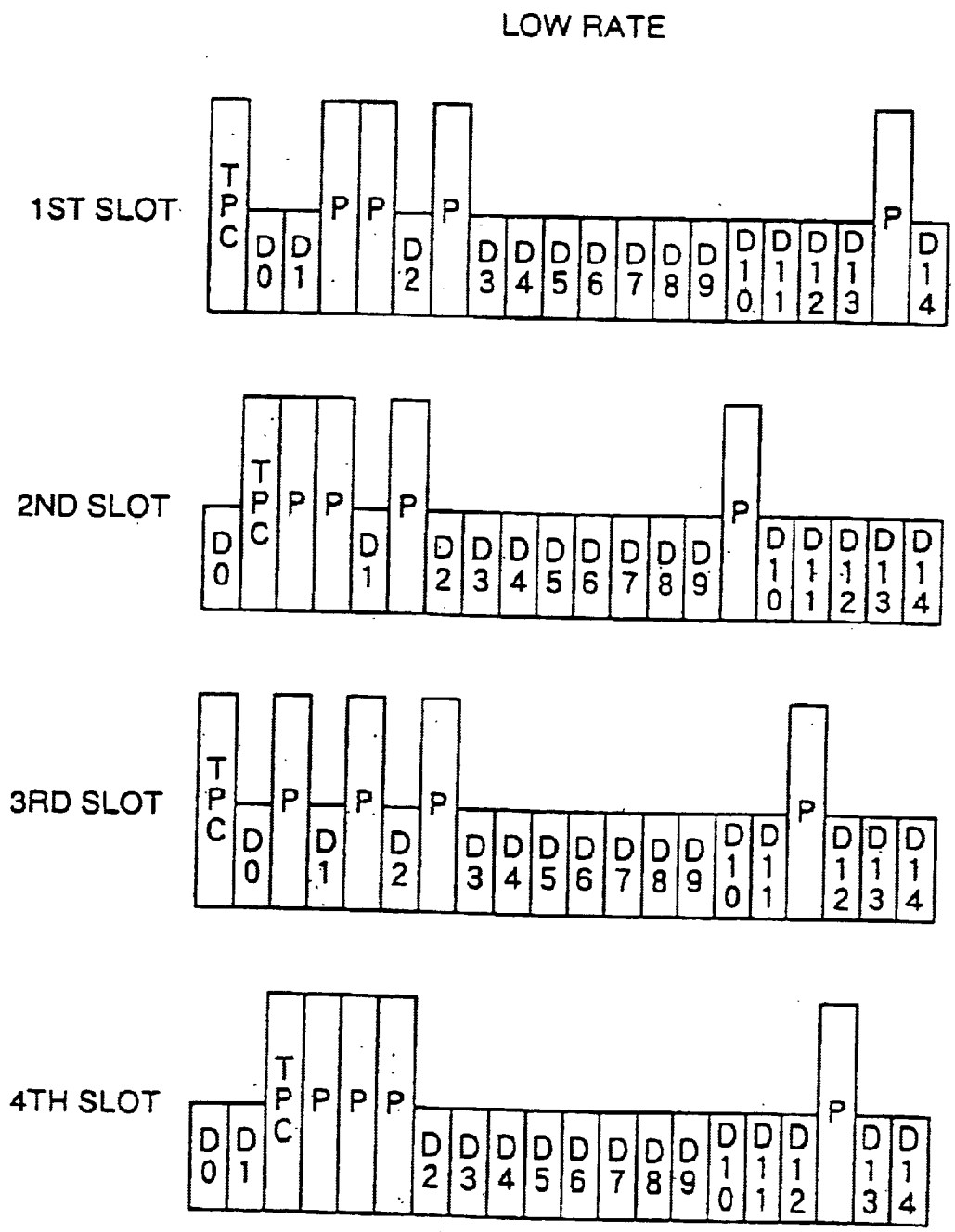

FIG. 18 shows a part of the configuration of slot assembly circuit 104 mounted in the CDMA radio transmitting apparatus in the present embodiment, indicating memory 1001 and address generator 1002. Memory 1001 contains high rate pattern area 1003 and low-rate/non-data pattern area 1004. High rate pattern area 1003 stores some of the placement patterns placed so that fixed data be concentrated on the first half of the slot as shown in FIG. 19A. Low-rate/non-data pattern area 1004 stores placement patterns in which fixed data is randomly placed within slots as shown in FIGS. 19B and 19C. Both areas 1003 and 104 store placement patterns according to the frame numbers and slot numbers in the same way as Embodiments 1 and 3, whereas for placement patterns of high rate pattern area 1003, the need for fixed data randomization is low, and thus a plurality of slot numbers may also be assigned to one placement pattern to achieve effective utilization of memory resource.

Then, the operation of Embodiment 4 configured as described above is explained below.

Figure 1:
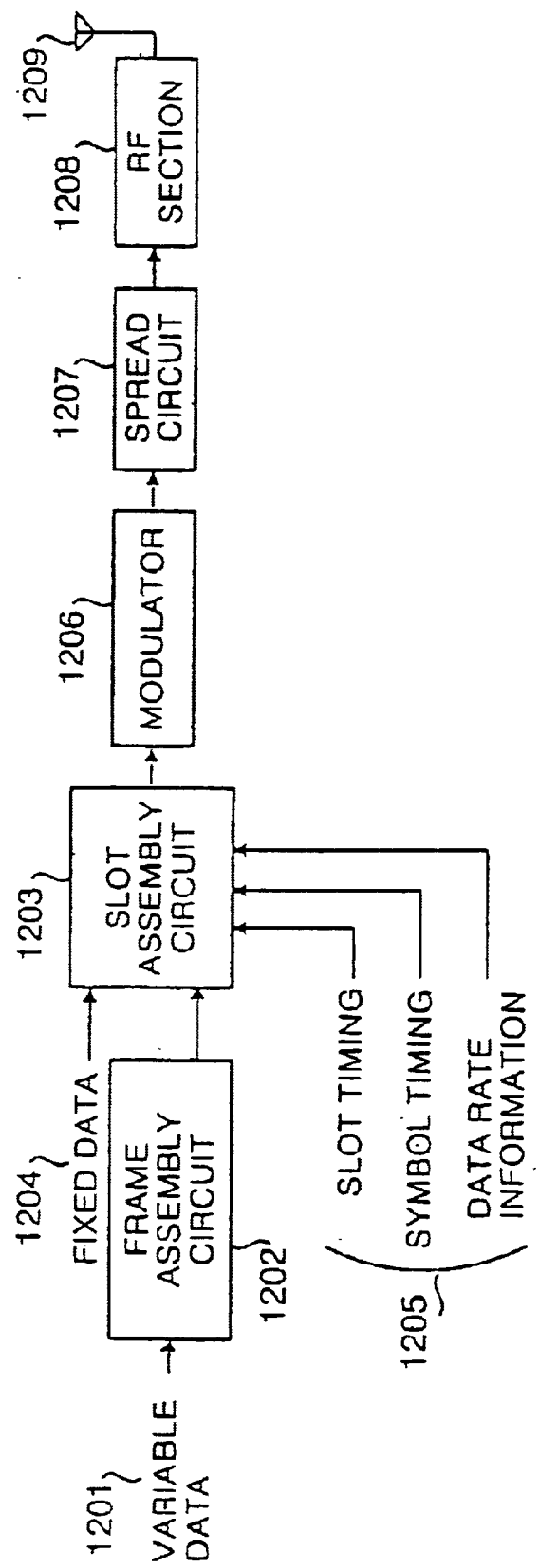
FIG. 1 is a configuration diagram of the CDMA radio transmitting apparatus.
Figure 2:
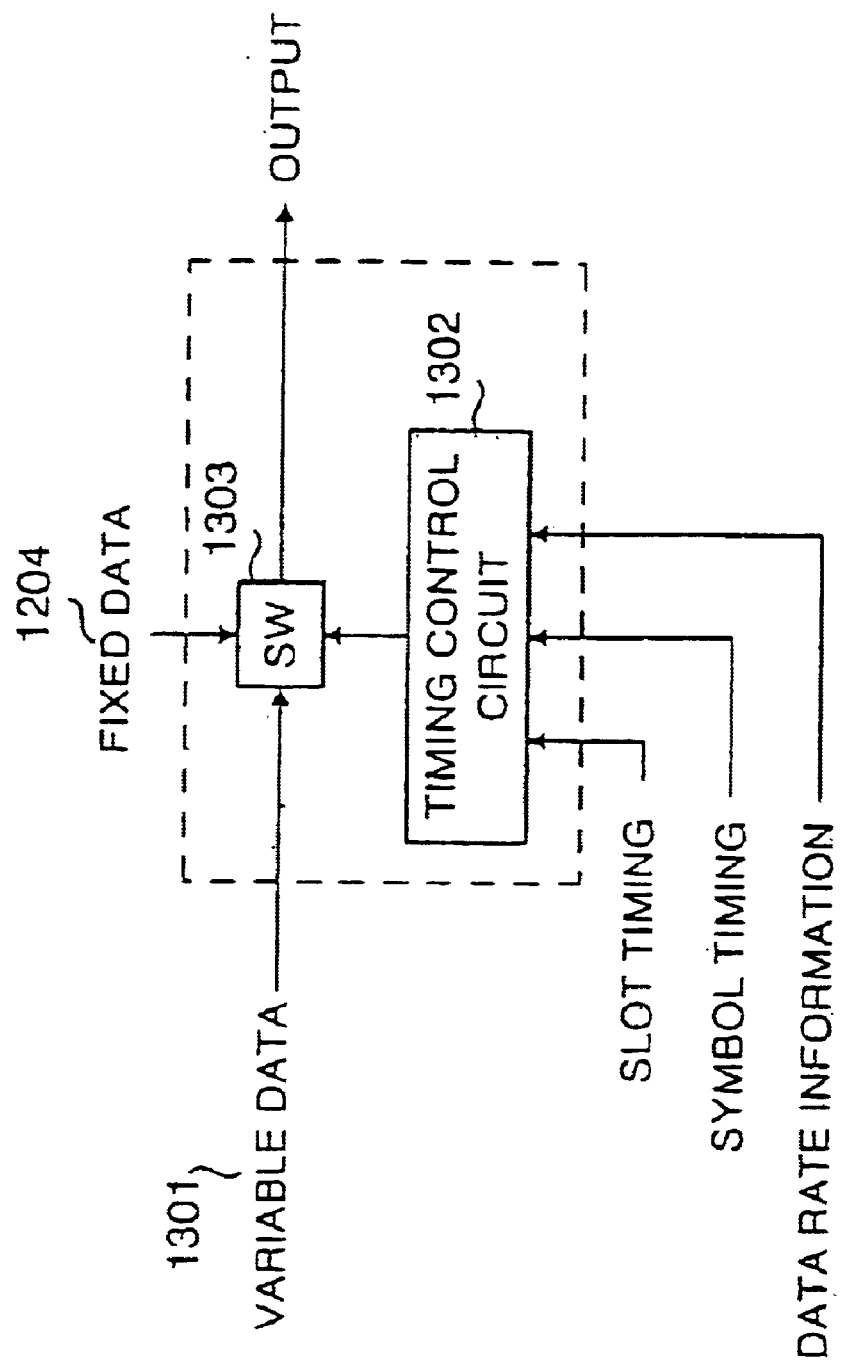
FIG. 2 is a configuration diagram of the slot assembly circuit in the CDMA radio transmitting apparatus.
Figure 3:
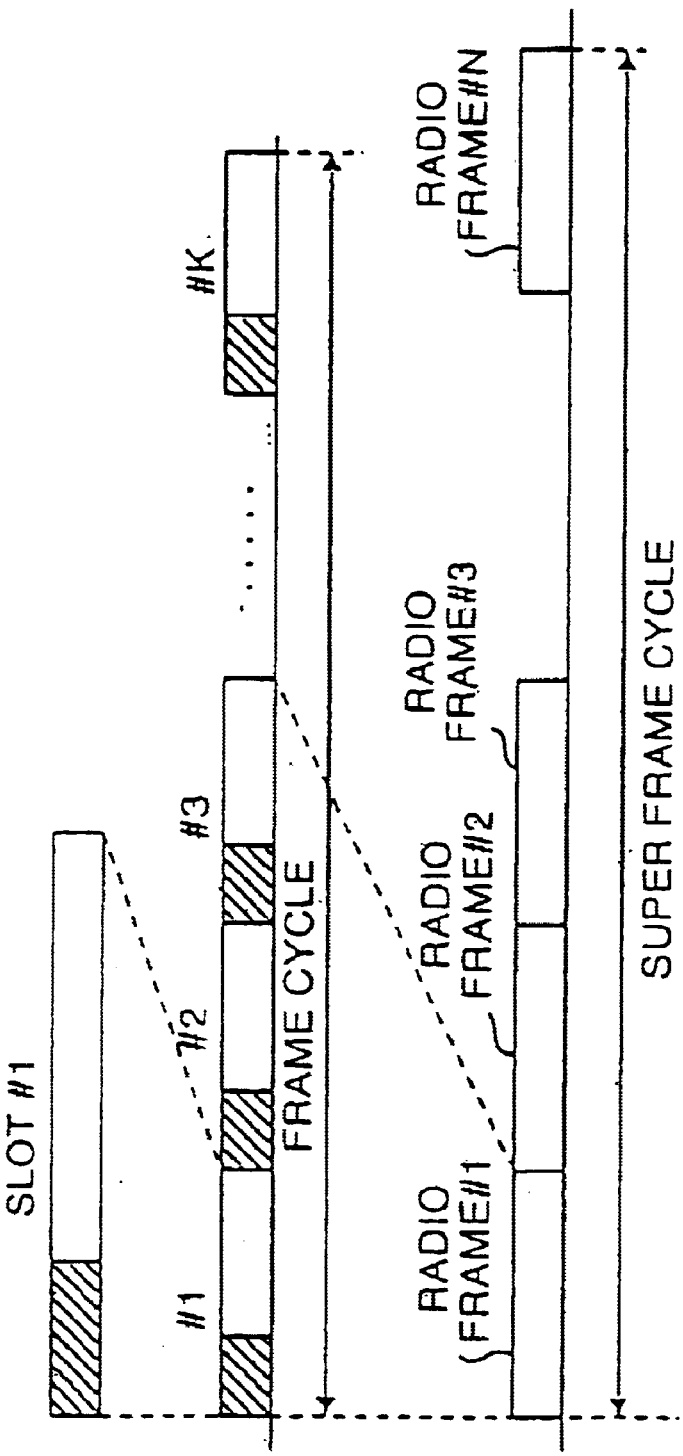
FIG. 3 is a frame configuration diagram of a transmit signal in the CDMA radio transmitting apparatus.
Figure 6:
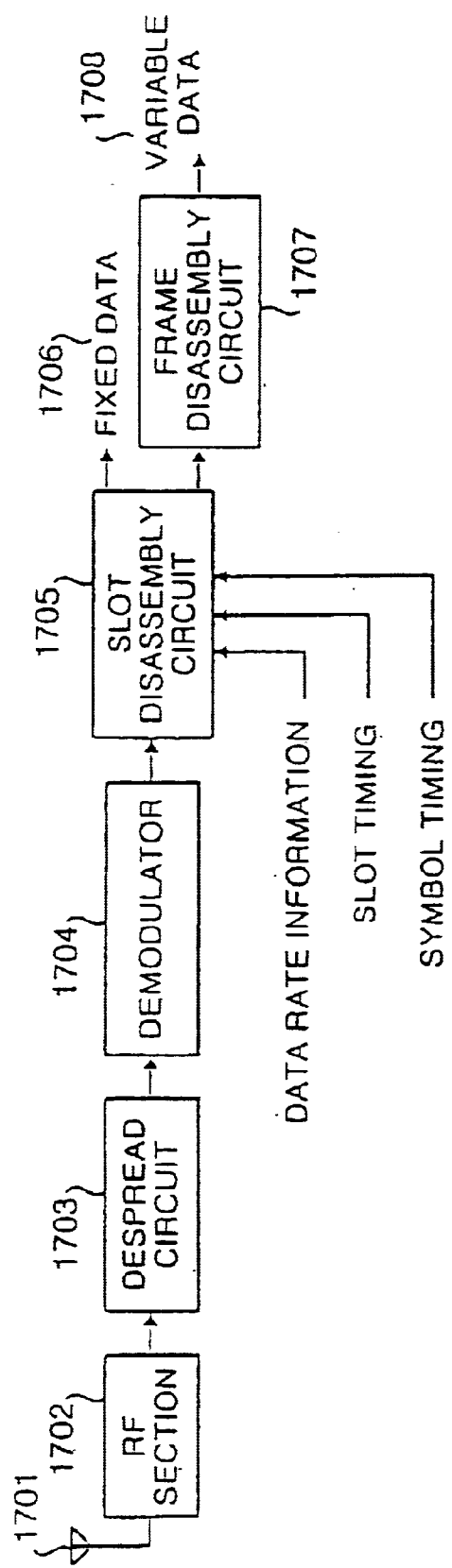
FIG. 6 is a configuration diagram of the conventional CDMA radio receive system.
Figure 7:
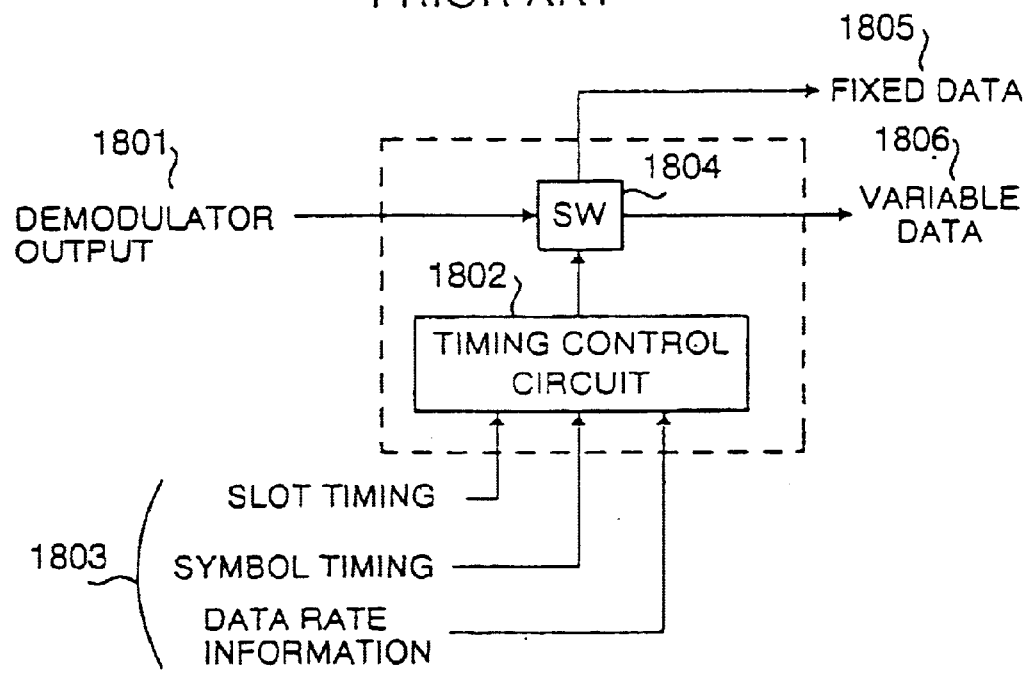
FIG. 7 is a configuration diagram of the slot disassembly circuit in the conventional CDMA radio receiving apparatus.
Figure 8:
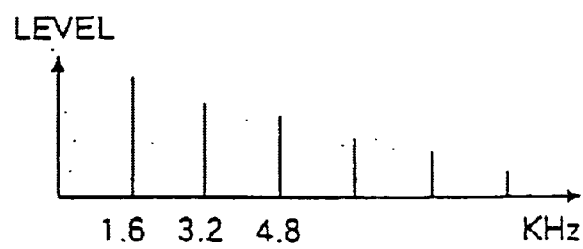
FIG. 8 is a frequency spectrum level status diagram when transmit power is turned ON/OFF by the conventional CDMA radio receiving apparatus.

As shown in FIG. 18, in slot assembly circuit 104, if the data rate of variable data is high such as voice period, address generator 1002 selects high rate pattern area 1003, while generating a memory address from a combination of frame number 112 and slot number 113 input at that time. From the generated memory address, the placement pattern in which fixed data is placed concentrated on the first half of the slot is read and given to timing control circuit 201 shown in FIG. 2 and used for control of switch 202. This results in a transmit pattern as shown in FIG. 19A in which fixed data is concentrated on the first half of the slot.

On the other hand, when the data rate of variable data is low or when there is no data as in the case of silent period, address generator 1002 selects low rate/non-data pattern area 1004, while generating a memory address from a combination of frame number 112 and slot number 113 input at that time. From the generated memory address, one placement pattern in which fixed data is randomized is read and given to timing control circuit 201 and used for control of switch 202. This results in a transmit pattern as shown in FIGS. 19B and 19C in which fixed data is randomized.

Now, suppose the case where fixed data consists of pilot symbols and a power control signal (TPC). According to theses "Effects of SIR Base Power Control in Coherent DS-CDMA Mobile Communication" and "Study on Instantaneous Value Variation Trailing Type Power Control Method in DS-CDMA Down-Link Channel," to measure SIR using fixed data of a receive signal and determine and transmit the transmit power control signal based on its result, it is necessary to place fixed data concentrated on the first half of the slot. In addition, performing coherent detection of TPC using pilot symbols in the fixed data and controlling power in the next slot also requires the fixed data to be placed concentrated on the first half of the slot. In the case that fixed data is concentrated on the first half of the slot and randomized at the same time, the randomization may not be carried out sufficiently, causing the problem of line spectrums with large power occurring in specific frequency components. However, it is when the power ratio of the fixed data to the variable data increases, that is, when there is no data or when the data rate is low that a line spectrum is generated in specific frequency components. In power control for each slot, carrying out SIR measurements using only part of fixed data will reduce the accuracy of measurements. Likewise, carrying out TPC synchronization detection using only some pilot symbols will deteriorate the receive characteristic.

On the other hand, in power control, it is when the data rate is high, that is, when influence with other user increases because of large average power that the receive characteristic of TPC and the accuracy of SIR measurements are important. Since at this time, the power ratio of the fixed data to variable data does not vary or decreases extremely, the randomization of the transmit timing of fixed data is unnecessary, or even if concentrated to a certain degree no line spectrums with large power will be generated in specific frequency components.

Therefore, as shown in Embodiment 4, it is possible to restrain line spectrums with large power from generating in specific frequency components by placing the fixed data so that it be concentrated on the first half of the slot if the data rate of variable data is high, or by more randomly placing the fixed data in the slot in the case of low rate or no data, or by securely randomizing the transmit timing for each slot if the quantity of variable data is small or when there is no data at all. Furthermore, when the data rate is high, since no line spectrums with large power are generated in specific frequency components, but fixed data is concentrated on the first half of the slot, it is possible to carry out TPC reception and SIR measurements without deteriorating the characteristic.

What is claimed is:

1. A CDMA radio transmission apparatus comprising:
   a data holding memory that stores a plurality of placement patterns corresponding to a plurality of fixed data, the fixed data having a quantity of data fixed with respect to time;
   a timing control circuit that randomizes a transmission timing of the fixed data by controlling placement of the fixed data based on the placement patterns, and transforms a quantity of variable data by repeating the variable data, the variable data having a quantity of data variable with respect to time; and
   a slot assembly circuit that time-multiplexes the variable data and the fixed data under the control of the timing control circuit.

2. The CDMA radio transmission apparatus according to claim 1,
   the data holding memory storing each of the plurality of placement patterns according to a corresponding frame number of one of a plurality of frames and a corresponding slot number of one of a plurality of slots, wherein a number of the placement patterns stored in the data holding memory equals a number of the slots contained in a super frame comprising the plurality of frames; and
   the slot assembly circuit extracting one of the plurality of placement patterns from the data holding memory based on the corresponding frame number and the corresponding slot number.

3. The CDMA radio transmission apparatus according to claim 1,
   the data holding memory storing a first pattern placement group comprising a first plurality of placement patterns, in which the fixed data is configured in a first half of a slot, and a second pattern placement group comprising a second plurality of placement patterns, in which the fixed data is randomized over an entirety of the slot; and
   the slot assembly circuit using a placement pattern from the first pattern placement group when the quantity of data variable with respect to time is large and using a placement pattern from the second pattern placement group when the quantity of data variable with respect to time is one of small and not present.

4. The CDMA radio transmission apparatus according to claim 1, the fixed data comprising at least one of a pilot signal, a transmission power control signal and a transmission rate information signal.

5. The CDMA radio transmission apparatus according to claim 1, further comprising:
   a modulator that modulates the time-multiplexed variable data and fixed data; and
   a radio transmitter that transmits the modulated time-multiplexed signal.

6. The CDMA radio transmission apparatus according to claim 1, wherein the timing control circuit maintains quantity of the variable data at a predetermined level by repeating the variable data.

7. A CDMA radio transmission apparatus comprising:
   a data holding memory that stores a plurality of placement patterns corresponding to a plurality of fixed data, the fixed data having a quantity of data fixed with respect to time;
   a frame assembly circuit that transforms a quantity of variable data by repeating the variable data, the variable data having a quantity of data variable with respect to time;
   a level controller that changes a transmission power of the variable data, in accordance with a number of the repetition of the variable data;
   a timing control circuit that randomizes a transmission timing of the fixed data by controlling a placement of the fixed data based on the placement patterns; and
   a slot assembly circuit that time-multiplexes the variable data and the fixed data under the control of the timing control circuit.

8. The CDMA radio transmission apparatus according to claim 7,
   the data holding memory storing each of the plurality of placement patterns according to a corresponding frame number of one of a plurality of frames and a corresponding slot number of one of a plurality of slots, wherein a number of the placement patterns stored in the data holding memory equals a number of the slots contained in a super frame comprising the plurality of frames; and the slot assembly circuit extracting one of the plurality of placement patterns from the data holding memory based on the corresponding frame number and the corresponding slot number.

9. The CDMA radio transmission apparatus according to claim 7, the data holding memory storing a first pattern placement group comprising a first plurality of placement patterns, in which the fixed data is configured in a first half of a slot, and a second pattern placement group comprising a second plurality of placement patterns, in which the fixed data is randomized over an entirety of the slot; and the slot assembly circuit using a placement pattern from the first pattern placement group when the quantity of data variable with respect to time is large and using a placement pattern from the second pattern placement group when the quantity of data variable with respect to time is one of small and not present.

10. The CDMA radio transmission apparatus according to claim 7, the fixed data comprising at least one of a pilot signal, a transmission power control signal and a transmission rate information signal.

11. The CDMA radio transmission apparatus according to claim 7, further comprising:

a modulator that modulates the time-multiplexed variable data and fixed data; and a radio transmitter that transmits the modulated time-multiplexed signal.

12. The CDMA radio transmission apparatus according to claim 7, wherein the frame assembly circuit maintains quantity of the variable data at a predetermined level by repeating the variable data.

* * * * *